United States Patent [19]

von Dadelszen

[11] Patent Number: 4,905,251

[45] Date of Patent: Feb. 27, 1990

[54] SELF-PREIONIZING RESISTIVELY BALLASTED SEMICONDUCTOR ELECTRODE

[75] Inventor: Michael von Dadelszen, Kirkland, Wash.

[73] Assignee: Spectra-Physics, Inc., San Jose, Calif.

[21] Appl. No.: 267,820

[22] Filed: Nov. 7, 1988

[51] Int. Cl.$^4$ .......................... H01S 3/00; H01S 3/097
[52] U.S. Cl. ........................................ 372/87; 372/38; 372/83; 372/86
[58] Field of Search .................... 372/86, 87, 38, 83

[56] References Cited

U.S. PATENT DOCUMENTS 4,703,490  10/1987  Brumme et al. ...................... 372/83

Primary Examiner—James W. Davie
Attorney, Agent, or Firm—Seed and Berry

[57] ABSTRACT

An electrode for a discharge region of a transversely purged gas discharge laser. The electrode in a discharge region includes blocks of semiconductor material having widely different dielectric constants configured about the center and ground electrodes of the discharge region. When the electrode is subjected to a quickly changing voltage pulse, the different time constants of the blocks of semiconductor material cause a surface discharge to be generated near the surface of the electrode. This surface discharge preionizes the discharge region. Subsequently, as the semiconductor regions become more resistive, the surface discharge dissipates and the electrodes behaves as a resistively ballasted discharge electrode. An electronic circuit for driving the electrode is also disclosed.

6 Claims, 2 Drawing Sheets

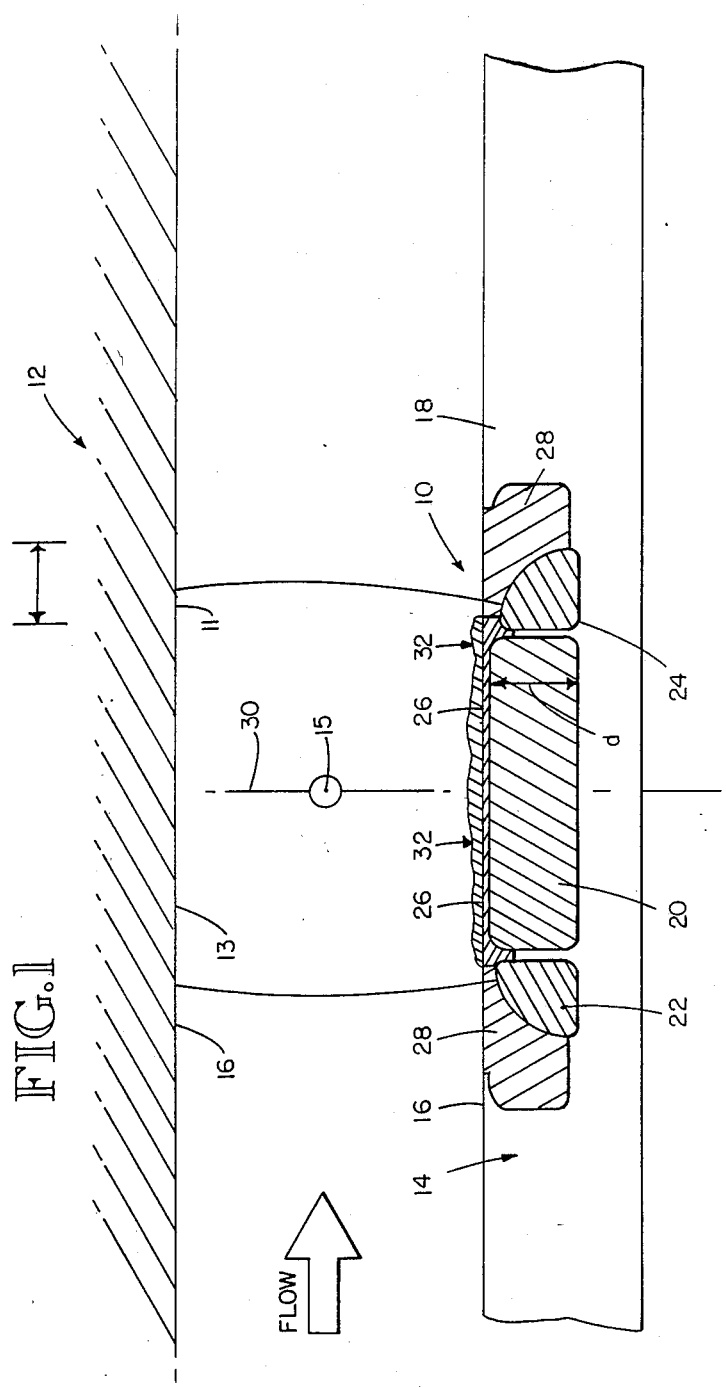

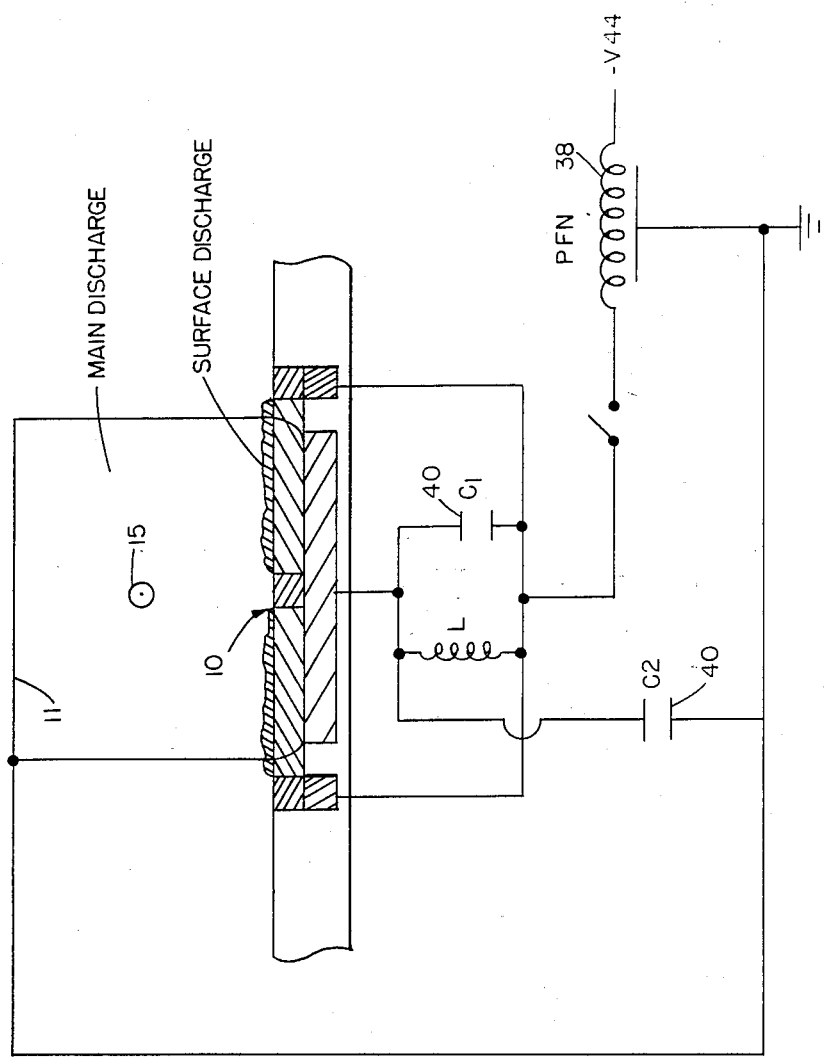

SELF-PREIONIZING RESISTIVELY BALLASTED SEMICONDUCTOR ELECTRODE

TECHNICAL FIELD

The present invention relates to high voltage discharge systems, and more particularly, to an electrode for self-preionizing and resistively ballasting the discharge region of a high voltage discharge system.

BACKGROUND ART

Many electrical systems involve the use of high voltage electrodes. Examples are gas discharge switches, spark gaps, thyratron switches, and electrostatic precipitators. While the detailed description of the preferred embodiment will be explained in terms of a gas dynamic laser system, those skilled in the art will recognize that the present invention applies equally well to each of the high voltage electrode applications described immediately above.

Gas discharge laser systems produce light by exciting the molecules of a laser gas to an elevated energy state, the excited molecules giving off the light at a characteristic frequency as the excited molecules relax to their original state. The gas molecules are excited by means of an electric field in the gas discharge region. The electric field is created by imposing a high voltage between a pair of electrodes within an enclosure containing the laser gas.

One means of increasing the effectiveness of the discharge region is to infuse it with ions, thereby increasing the number of gas molecules that can be excited when the discharge voltage is applied across the electrodes. One common means of providing such ionization is to flood the discharge region with ionizing particles, such as electrons. The ionizing source is typically an electron gun, source of radioactivity, or source of ultraviolet (UV) radiation. Adding any such system to a discharge system increases the complexity, weight, and cost of the discharge section. Therefore, it is advantageous to provide the discharge section with a self-preionizing electrode.

DISCLOSURE OF THE INVENTION

It is an object of the present invention to provide a discharge section with an electrode capable of preionizing the discharge section.

It is another object of the present invention to provide a preionization source that requires no external energy.

It is yet another object of the present invention to provide an electrode that is made from commonly available materials.

Still another object of the present invention is to provide an electrode that is resistively ballasted to improve discharge uniformity.

According to one aspect, the invention is an electrode for use with a gas discharge laser. The electrode has an upper surface and is subjected to a predetermined voltage waveform which has a first, rapidly-changing portion. The electrode comprises a first electrical conductor, one or more second electrical conductors, a block of a dielectric material, and an electronic circuit connected between the first electrical conductor and the one or more second electrical conductors. The block of a dielectric material is contoured to define a portion of the upper surface of the electrode, while the remainder of the block is contoured to receive the first and second electrical conductors below the upper surface of the electrode.

The electronic circuit is connected between the first electrical conductor and the one or more second electrical conductors. The circuit comprises a block of a first semiconductor material that has a first dielectric constant and is in electrical contact with portions of both the first electrical conductor and the one or more second electrical conductors. A surface of the block of the first semiconductor material forms a portion of the upper surface of the electrode. The circuit also comprises two blocks of a second semiconductor material having a second dielectric constant that is substantially smaller than the first dielectric constant, the two blocks of the second semiconductor material forming the remainder of the upper surface of the electrode. One of the two blocks is in electrical contact with the first electrical conductor and the other of the two blocks is in electrical contact with both the dielectric material and one of the one or more second electrical conductors.

The circuit connects the first electrical conductor to the one or more second conductors through a path which is primarily capacitive during the first portion of the voltage waveform and primarily resistive subsequent to the first portion of the voltage waveform. By this structure in the electrode, surface discharges are initiated above the portion of the first semiconductor material that forms the upper surface of the electrode during the first portion of the voltage waveform. The electrode is resistively ballasted subsequent to the first portion of the voltage waveform.

In another aspect the invention is a discharge section for use with a transverse flow gas discharge laser having an optical axis. The discharge section comprises a first surface spaced apart from the optical axis and including a first electrode and a second surface spaced apart from the optical axis. The second surface is opposite and electrically isolated from the first surface. The second surface includes a second electrode that is subjected to a predetermined voltage waveform which has a first, rapidly-changing portion.

The second electrode comprises a first elongated electrical conductor that is generally parallel to the optical axis, one or more second elongated electrical conductors that are generally parallel to the optical axis, and an elongated block of a dielectric material. A portion of the block is contoured to define a portion of the second surface. The remainder of the block is contoured to receive the first and second electrical conductors below the second surface of the second electrode.

The second electrode further comprises an electronic circuit connected between the first electrical conductor and the one or more second electrical conductors. The circuit comprises an elongated block of a first semiconductor material having a first dielectric constant. The elongated block of a first semiconductor material is coextensive and in electrical contact with both the first electrical conductor and the one or more second electrical conductors. A surface of the block of the first semiconductor material forms a portion of the second surface of the second electrode. The circuit further comprises two elongated blocks of a second semiconductor material having a second dielectric constant that is substantially smaller than the first dielectric constant. The two blocks of the second semiconductor material form the remainder of the second surface of the second electrode. One of the two blocks is coextensive and in electrical contact with the first electrical conductor. The other of the two blocks is coextensive and in electrical contact with both the dielectric material and one of the one or more second electrical conductors. The circuit connects the first electrical conductor to the one or more second conductors through a path which is primarily capacitive during the first portion of the voltage waveform and primarily resistive subsequent to the first portion of the voltage waveform. By this discharge section, surface discharges are initiated above the portion of the first semiconductor material that forms the second surface of the second electrode during the first portion of the voltage waveform and the electrode is resistively ballasted subsequent to the first portion of the voltage waveform.

BRIEF DESCRIPTION OF THE DRAWINGS

FIG. 1 is a transverse cross section of the discharge region of a gas discharge laser.

FIG. 2 is an electrical schematic of a self preionizing circuit configuration according to the present invention.

DETAILED DESCRIPTION OF THE PREFERRED EMBODIMENT

When a voltage is suddenly applied across a semiconductor, the current through the semiconductor is initially dominated by displacement current (i.e., the semiconductor responds like a capacitor). After a time, however, the displacement current diminishes and conduction current dominates (i.e., the semiconductor responds like a resistor). The timescale for this transition is given by the product of the semiconductor resistivity and dielectric constant (i.e., an RC timeconstant). The self-preionizing, semiconductor electrode concept uses this intrinsic semiconductor timescale to both preionize and resistively ballast a gas discharge in a flow compatible geometry.

The self preionizing electrode concept is illustrated in FIG. 1. The electrode 10 can be located in the discharge region 12 of a gas discharge laser system. While the following description will be explained in terms of a discharge region of a discharge laser system, it will be understood by those skilled in the art that the concept of a self-preionizing electrode is equally applicable to other discharge regions, not involving laser systems.

The discharge section 12 can include two electrodes, the electrode 10 and an electrode 11. The electrode 10 can serve as a cathode while the electrode 11 can serve as an anode, which can be connected to electrical ground (not shown). The electrodes 10 and 11 are electrically insulated from one another. The electrode 10 is formed in one wall 14 of the discharge region 12, another wall 13 being disposed oppositely with respect to an optical axis 15, which can be parallel to the walls 13 and 14. Since the example shown is that of a transverse flow gas discharge laser, the surface 16 of the wall 14 can be contoured to be substantially continuous (e.g., planar or parallel) in order to minimize the influence of the electrode 10 on the aerodynamics of the gas flowing through the discharge region 12. The electrode 10 includes a surrounding dielectric material 18 which serves to electrically isolate the remainder of the electrode 10 from the rest of the structure of the discharge region 12, metal conductors 20, 22 and 24, a block of a first semiconductor 26, and blocks 28 of a second semiconductor. The dielectric constant of the first semiconductor material is substantially greater than the dielectric constant of the second semiconductor material. The electrode 10 is symmetric about a center line 30 to ensure a symmetric discharge.

The timescale, $\tau_1$, is much greater than $\tau_2$. Therefore, when a voltage is quickly applied between the center conductor 20 and the side conductors 22 and 24, the initial coupling between them is predominantly capacitive. After a time constant $\tau_2$, the regions of the electrode 10 which contain blocks 28 of the second semiconductor material will be predominantly resistive, while the block 26 of the first semiconductor material will remain capacitive, due to its longer time constant.

During this phase the conditions and geometry of the electrode 10 serve to initiate two surface discharges 32, symmetric about the center line 30. The side conductors 22 and 24 and the blocks of the second semiconductor regions attached to them act as one electrode for each discharge 32. The center conductor 20 and the small block 28 of the second semiconductor region attached to it act as the other electrode and as a backplane. Also the block 26 of the first semiconductor material acts as a dielectric (capacitive) substrate. The surface discharges 32 will both preionize the main discharge region 12 and act as a plasma cathode for the avalanche and initial phases of the main discharge to follow.

After a further time, $\tau_1$, the block 26 of the first semiconductor material will act resistively and the surface discharges 32 will terminate. The main discharge will now flow through the semiconductor regions 26 and 28, which have reached the same level of resistivity, giving the electrode 10 a resistively ballasted discharge configuration for long pulse, stable discharges.

FIG. 1 shows how the concept might be implemented in a repetition-rated discharge device. By profiling the various interfaces of the conductors 20, 22, and 24 and the blocks 26 and 28 of the semiconductor material to avoid field enhancements, it should be possible to design a completely smooth electrode surface with no profiling of the flow surfaces 16, or even to incorporate the electrode 10 directly into a nozzle geometry. This is obviously highly attractive for a forced convection laser head.

FIG. 2 shows one possible circuit configuration, which would enable the preionization, avalanche and discharge phases of the electrode 10 to be initiated by a pulse forming network (PFN) circuit 38. The best results are obtained from the surface discharges 30 (see FIG. 1) when the backplane of the dielectric 18 is positive. It would also be desirable to operate the semiconductor electrode 10 as the discharge cathode in the discharge region 12. The circuit illustrated in FIG. 2 achieves these goals. Capacitors 40 and 42 capacitively divide the charge voltage 44 applied to the PFN 38 to give the desired surface discharge-initiating voltage. The LC time constant would be set equal to $\tau_1$, so that as the blocks 26 of the first semiconductor region become conductive, the current of the PFN 38 is fed directly to the center electrode conductor 20. The capacitances 40 and 42 also serve to limit the total charge dissipated by the surface discharge 32, which should greatly enhance the lifetime of the electrode 10.

Other circuits, such as conventional Spiker/Sustainer circuits, can also be added to the circuit of FIG. 2 so that part of the spiker voltage is applied across the surface discharge 32 (see FIG. 1). FIG. 2 illustrates that a single electrical circuit is adequate for preionization, avalanche and discharge.

An example of a potential application of the self-pre-ionizing semiconductor electrode 10 in a 1 atm $CO_2$ laser discharge is given below. The values given are qualitative only, and serve to illustrate that this electrode concept does not rely on unrealistic material properties.

Assume that the sustaining discharge electric field is 5 kV/cm and that the desired discharge current density is 1 A/cm². Then $$P \text{ discharge} = 5000 \Omega\text{-cm}.$$

For the block 26 of the first semiconductor material to adequately ballast the discharge, but not waste too much energy, it should probably have about the same resistivity as the discharge, i.e. (referring to FIG. 1)

$$P = 5000 \Omega\text{-cm}.$$

Assume it is desired that $\tau_1 > 100$ ns and $\tau_2 < 10$ ns, then the semiconductor timescale relation requires that $$\epsilon_1 > 226 \epsilon_0$$

and $$\epsilon_2 < 22.6 \epsilon_0$$

These values of resistivity and dielectric constant are not unreasonable. There are commercially available heating elements made of metal doped barium titanate. Doped high dielectric constant ceramics with tailored, temperature-dependent conductivities from approximately 100 ohm-centimeters to approximately $10^5$ ohm-centimeters are also used for thermistors. If the dimensions of the discharge region are 4 cm×4 cm, then the sustaining voltage is 20 kV, and the charge voltage of the PFN 38 is 40 kV. The surface discharges 32 will only need about 5 kV, thus the capacitive divider (capacitors 40 and 42) in FIG. 2 will have $C_1/C_2 \approx 8$. If the block 26 of the first semiconductor material has a dielectric strength of 200 V/mil and it needs to hold off 5 kV during the surface discharge phase, then its thickness d, should be approximately 1 mm (7.9 kV). The voltage dropped across the semiconductors during the main discharge phase is 0.1 cm×5,000 ohm-cm×1 $A/cm^2$ = 500 V.

These are particularly attractive values for different reasons. From a discharge perspective, if one wanted to design a semiconductor electrode surface layer to ballast a cathode, the desired voltage drop across the semiconductor would be the cathode sheath voltage (typically about 300–400 V). This is the minimum voltage drop which would adequately stablize the discharge. Furthermore, a semiconductor thickness less than or of the order of the separation of discharge spots on the cathode would inhibit the spots from coalescing into a strong filament which precedes an arc. Cathode spot separations are typically about several mm for 1 atmosphere discharges. Thus, the 500 V drop and semiconductor thickness of 1 mm, derived from the surface discharge approach, are close to optimum for use as a ballasted cathode.

The power dissipated in the semiconductors is only 500 $W/cm^2$, during the discharge, which is not much greater than the power dissipated by the cathode sheath. Thus cathode cooling requirements are only increased by the amount of cathode sheath heating increment. Also, less than 2.5% of the energy of the PFN 38 is dissipated in the semiconductor (not including the surface discharge phase), and the efficiency penalty is small.

The main potential drawback for the semiconductor electrode concept is surface discharge damage of the semiconductors, and the inherent lifetime limitations. By using the coupling capacitors and intrinsic dielectric timeconstant to limit the charge carried across the surface, and by careful material selection, this damage rate should be minimized.

While the detailed description above has been expressed in terms of a specific example, those skilled in the art will appreciate that many other electrode configurations and driving circuits could be used to accomplish the purposes of the disclosed inventive apparatus. Accordingly, it can be appreciated that various modifications and applications of the above-described embodiment may be made without departing from the spirit and scope of the invention. Therefore, the spirit and scope of the present invention are to be limited only by the following claims.

I claim:

1. An electrode for use with a gas discharge laser having a discharge region, the electrode having a surface in the gas discharge region and being subjected to a predetermined voltage waveform, the voltage waveform having a first, rapidly-changing portion, the electrode comprising:

a first electrical conductor;
   one or more second electrical conductors;
   a block of a dielectric material, a portion of the block being contoured to define a portion of the surface of the electrode, the remainder of the block being contoured to receive the first and second electrical conductors below the surface of the electrode; and
   an electronic circuit connected between the first electrical conductor and the one or more second electrical conductors, the circuit comprising:
   a block of a first semiconductor material having a first dielectric constant and being in electrical contact with portions of both the first electrical conductor and the one or more second electrical conductors, a surface of the block of the first semiconductor material forming a portion of the surface of the electrode, and
   two blocks of a second semiconductor material having a second dielectric constant that is substantially smaller than the first dielectric constant, the two blocks of the second semiconductor material forming the remainder of the surface of the electrode, one of the two blocks being in electrical contact with the first electrical conductor and the other of the two blocks being in electrical contact with both the dielectric material and one of the one or more second electrical conductors,
   the circuit connecting the first electrical conductor to the one or more second conductors through a path which is primarily capacitive during the first portion of the voltage waveform and primarily resistive subsequent to the first portion of the voltage waveform,
   whereby surface discharges are initiated above the portion of the first semiconductor material that form the surface of the electrode during the first portion of the voltage waveform and the electrode is resistively ballasted subsequent to the first portion of the voltage waveform.

2. An elongated electrode for use with a gas discharge laser having a gas discharge region and an optical axis, the electrode having a surface in the gas discharge region that is spaced apart from the optical axis, the electrode being subjected to a predetermined voltage waveform, the voltage waveform having a first, rapidly-changing portion, the electrode comprising:
  a first elongated electrical conductor that is generally parallel to the optical axis;
  one or more second elongated electrical conductors that are generally parallel to the optical axis;
  an elongated block of a dielectric material, a portion of the block being contoured to define a portion of the surface of the electrode, the remainder of the block being contoured to receive the first and second electrical conductors below the surface of the electrode; and
  an electronic circuit connected between the first electrical conductor and the one or more second electrical conductors, the circuit comprising:
  an elongated block of a first semiconductor material having a first dielectric constant and being coextensive and in electrical contact with both the first electrical conductor and the one or more second electrical conductors, a surface of the block of the first semiconductor material forming a portion of the surface of the electrode, and
  two elongated blocks of a second semiconductor material having a second dielectric constant that is substantially smaller than the first dielectric constant, the two blocks of the second semiconductor material forming the remainder of the surface of the electrode, one of the two blocks being coextensive and in electrical contact with the first electrical conductor and the other of the two blocks being coextensive and in electrical contact with both the dielectric material and one of the one or more second electrical conductors,
  the circuit connecting the first electrical conductor to the one or more second conductors through a path which is primarily capacitive during the first portion of the voltage waveform and primarily resistive subsequent to the first portion of the voltage waveform,
  whereby surface discharges are initiated above the portion of the first semiconductor material that forms the surface of the electrode during the first portion of the voltage waveform and the electrode is resistively ballasted subsequent to the first portion of the voltage waveform.

3. The electrode of claim 2 wherein the conductors, the block of dielectric material, and the block of the first and second semiconductor materials are transversely profiled to reduce any enhancements of an electric field produced by the voltage waveform.

4. A discharge section for use with a transverse flow gas discharge laser having an optical axis, comprising:
  a first surface spaced apart from the optical axis, said first surface including a first electrode; and
  a second surface spaced apart from the optical axis, the second surface being opposite and electrically isolated from the first surface, the second surface including a second electrode that is subjected to a predetermined voltage waveform, the voltage waveform having a first, rapidly-changing portion, the second electrode comprising:
  a first elongated electrical conductor that is generally parallel to the optical axis;
  one or more second elongated electrical conductors that are generally parallel to the optical axis;
  an elongated block of a dielectric material, a portion of the block being contoured to define a portion of the second surface, the remainder of the block being contoured to receive the first and second electrical conductors below the second surface of the second electrode; and
  an electronic circuit connected between the first electrical conductor and the one or more second electrical conductors, the circuit comprising:
  an elongated block of a first semiconductor material having a first dielectric constant and being coextensive and in electrical contact with both the first electrical conductor and the one or more second electrical conductors, a surface of the block of the first semiconductor material forming a portion of the second surface of the second electrode, and
  two elongated blocks of a second semiconductor material having a second dielectric constant that is substantially smaller than the first dielectric constant, the two blocks of the second semiconductor material forming the remainder of the second surface of the second electrode, one of the two blocks being coextensive and in electrical contact with the first electrical conductor and the other of the two blocks being coextensive and in electrical contact with both the dielectric material and one of the one or more second electrical conductors,
  the circuit connecting the first electrical conductor to the one or more second conductors through a path which is primarily capacitive during the first portion of the voltage waveform and primarily resistive subsequent to the first portion of the voltage waveform,
  whereby surface discharges are initiated above the portion of the first semiconductor material that forms the second surface of the second electrode during the first portion of the voltage waveform and the electrode is resistively ballasted subsequent to the first portion of the voltage waveform.

5. The discharge section of claim 4 wherein the first and second surfaces are contoured transversely to the optical axis.

6. The discharge section of claim 5 wherein the first and second surfaces are planar and mutually parallel.

* * * * *